(12) United States Patent
Van Wely

(10) Patent No.: US 8,880,619 B2
(45) Date of Patent: *Nov. 4, 2014

(54) DIRECT ACCESS ELECTRONIC MAIL (EMAIL) DISTRIBUTION AND SYNCHRONIZATION SYSTEM WITH TRUSTED OR VERIFIED IMAP-IDLE IMPLEMENTATION

(75) Inventor: Matthew Van Wely, Issaquah, WA (US)

(73) Assignee: BlackBerry Limited, Waterloo, Ontario (CA)

(*) Notice: Subject to any disclaimer, the term of this patent is extended or adjusted under 35 U.S.C. 154(b) by 794 days.

This patent is subject to a terminal disclaimer.

(21) Appl. No.: 12/409,543

(22) Filed: Mar. 24, 2009

(65) Prior Publication Data

US 2010/0250681 A1 Sep. 30, 2010

(51) Int. Cl.
*G06F 11/00* (2006.01)
*G06F 15/16* (2006.01)
*G06F 15/173* (2006.01)
*G06F 15/177* (2006.01)
*H04L 12/58* (2006.01)
*G06Q 10/10* (2012.01)
*H04L 29/08* (2006.01)
*H04L 29/06* (2006.01)
*H04W 28/04* (2009.01)

(52) U.S. Cl.
CPC .......... *G06Q 10/107* (2013.01); *H04L 12/5875* (2013.01); *H04L 51/30* (2013.01); *H04L 67/14* (2013.01); *H04L 12/585* (2013.01); *H04L 12/58* (2013.01); *H04L 51/22* (2013.01); *H04L 29/0602* (2013.01); *H04L 51/24* (2013.01); *H04L 51/38* (2013.01); *H04L 12/5895* (2013.01); *H04L 67/1095* (2013.01); *G06Q 10/10* (2013.01); *H04W 28/04* (2013.01)
USPC ........ 709/206; 455/412.1; 709/219; 709/221; 709/224; 714/41

(58) Field of Classification Search
CPC ..... H04L 12/8575; H04L 51/30; H04L 67/14; H04L 12/585; H04L 12/58; H04L 51/00; H04L 51/22; H04L 29/0602; H04L 51/24; H04L 51/38; H04L 12/5895; H04L 67/1095; G06Q 10/107; G06Q 10/10; H04W 28/04
USPC .............. 709/206, 219, 221, 224; 455/412.1; 714/41

See application file for complete search history.

(56) References Cited

U.S. PATENT DOCUMENTS 6,138,251 A * 10/2000 Murphy et al. ................. 714/41
6,708,206 B1 * 3/2004 Thrane et al. ................. 709/219

(Continued)

FOREIGN PATENT DOCUMENTS

WO 2004/017583 2/2004 ............. H04L 12/58

OTHER PUBLICATIONS

Leiba, Barry. "RFC 2177, IMAP4 Idle command". Jun. 1997, pp. 1-5.*

(Continued)

*Primary Examiner* — Daniel C Murray
(74) *Attorney, Agent, or Firm* — Allen, Dyer, Doppelt, Milbrath & Gilchrist, P.A.

(57) ABSTRACT

A communications system includes a network engine that communicates with a plurality of a user subscribed mobile wireless communications devices via a communications network for sending and receiving emails. A direct access server is connected to the network engine for polling electronic mailboxes of users from an email source and retrieving electronic messages from the electronic mailboxes and pushing any electronic mailboxes to the network engine to selected users subscribed mobile wireless communications devices. The direct access server communicates with an email source using the internet message access protocol (IMAP) and IMAP-Idle supportable connections in a communications channel to accept real-time notifications. The direct access server verifies an Idle command functionality on the communications channel before relying on the communications channel for new mail notifications.

16 Claims, 7 Drawing Sheets

(56) References Cited

U.S. PATENT DOCUMENTS

| | | | |
|---|---|---|---|
| 6,779,019 B1 | 8/2004 | Mousseau et al. | 709/206 |
| 6,959,325 B2 | 10/2005 | Gardner et al. | 709/206 |
| 7,043,240 B2 | 5/2006 | Clarke et al. | 455/432.2 |
| 7,107,310 B2 | 9/2006 | McCarthy | 709/203 |
| 7,111,047 B2 * | 9/2006 | McCarthy et al. | 709/206 |
| 7,162,223 B2 | 1/2007 | Kamat | 455/412.1 |
| 7,162,714 B2 * | 1/2007 | Wenisch | 717/127 |
| 7,194,252 B1 * | 3/2007 | Jordan, Jr. | 455/412.1 |
| 7,206,816 B2 * | 4/2007 | Gorty et al. | 709/206 |
| 7,289,495 B2 * | 10/2007 | Roy | 370/381 |
| 7,289,975 B2 | 10/2007 | Clarke et al. | 707/1 |
| 7,490,148 B1 * | 2/2009 | Gerlach et al. | 709/224 |
| 7,561,868 B2 * | 7/2009 | Jordan, Jr. | 455/412.2 |
| 7,849,142 B2 * | 12/2010 | Clegg et al. | 709/206 |
| 8,326,932 B2 * | 12/2012 | Khan et al. | 709/206 |
| 8,407,298 B2 * | 3/2013 | Kamat et al. | 709/206 |
| 8,495,159 B2 * | 7/2013 | Khan et al. | 709/206 |
| 8,572,185 B2 * | 10/2013 | Williams et al. | 709/206 |
| 8,626,841 B2 * | 1/2014 | Gorty et al. | 709/206 |
| 8,688,822 B2 * | 4/2014 | Maes | 709/224 |
| 2003/0050046 A1 * | 3/2003 | Conneely et al. | 455/412 |
| 2003/0050049 A1 * | 3/2003 | Sundstrom | 455/414 |
| 2003/0061288 A1 * | 3/2003 | Brown et al. | 709/206 |
| 2005/0055443 A1 | 3/2005 | Tosey et al. | 709/225 |
| 2006/0031359 A1 * | 2/2006 | Clegg et al. | 709/206 |
| 2006/0085429 A1 * | 4/2006 | Wener et al. | 707/10 |
| 2006/0116968 A1 * | 6/2006 | Arisawa | 705/67 |
| 2007/0072589 A1 | 3/2007 | Clarke | 455/414.1 |
| 2007/0073813 A1 | 3/2007 | Kamat et al. | 709/206 |
| 2007/0073814 A1 | 3/2007 | Kamat et al. | 709/206 |
| 2007/0073817 A1 | 3/2007 | Gorty | 709/206 |
| 2007/0073819 A1 | 3/2007 | Gardner et al. | 709/206 |
| 2007/0078934 A1 | 4/2007 | Gardner | 709/206 |
| 2007/0083599 A1 | 4/2007 | Provo | 709/206 |
| 2007/0226301 A1 | 9/2007 | Provo | 709/206 |
| 2007/0299918 A1 * | 12/2007 | Roberts | 709/206 |
| 2008/0040441 A1 * | 2/2008 | Maes | 709/207 |
| 2008/0256179 A1 * | 10/2008 | Gorty et al. | 709/203 |
| 2008/0256202 A1 * | 10/2008 | Williams et al. | 709/206 |
| 2008/0256203 A1 * | 10/2008 | Gorty et al. | 709/206 |
| 2008/0256204 A1 * | 10/2008 | Kamat et al. | 709/206 |
| 2008/0256206 A1 * | 10/2008 | Lee et al. | 709/206 |
| 2010/0088387 A1 * | 4/2010 | Calamera | 709/207 |
| 2010/0217815 A1 * | 8/2010 | Khan et al. | 709/206 |
| 2013/0018976 A1 * | 1/2013 | Khan et al. | 709/213 |

OTHER PUBLICATIONS

Leiba, "*IMAP4 Idle Command*," IETF Standard—Working Draft, Internet Engineering Task Force, Feb. 1, 1997, pp. 1-4.

Melnikov, et al., "*IMAP4 Extensions for Quick Reconnect*," IETF Standard—Working Draft, Internet Engineering Task Force, May 15, 2006, pp. 1-23.

"Reliability of Push E-Mail on Three," Whirlpool, Internet Article: http://forums.whirlpool.net.au/archive/931300, Mar. 5, 2008, 3 pages.

* cited by examiner

DIRECT ACCESS ELECTRONIC MAIL (EMAIL) DISTRIBUTION AND SYNCHRONIZATION SYSTEM WITH TRUSTED OR VERIFIED IMAP-IDLE IMPLEMENTATION

TECHNICAL FIELD

The present disclosure relates to the field of communications systems, and, more particularly, to electronic mail (email) communications systems and related methods.

BACKGROUND

Electronic mail (email) has become an integral part of business and personal communications. As such, many users have multiple email accounts for work and home use. Moreover, with the increased availability of mobile cellular and wireless local area network (LAN) devices that can send and receive emails, many users wirelessly access emails from mailboxes stored on different email storage servers (e.g., corporate email storage server, Yahoo, Hotmail, AOL, etc.).

Yet, email distribution and synchronization across multiple mailboxes and over wireless networks can be quite challenging, particularly when this is done on a large scale for numerous users. For example, different email accounts may be configured differently and with non-uniform access criteria. Moreover, as emails are received at the wireless communications device, copies of the emails may still be present in the original mailboxes, which can make it difficult for users to keep their email organized.

One particularly advantageous "push" type email distribution and synchronization system is disclosed in U.S. Pat. No. 6,779,019 to Mousseau et al., which is assigned to the present Assignee and is hereby incorporated herein by reference. This system pushes user-selected data items from a host system to a user's mobile wireless communications device upon detecting the occurrence of one or more user-defined event triggers. The user may then move (or file) the data items to a particular folder within a folder hierarchy stored in the mobile wireless communications device, or may execute some other system operation on a data item. Software operating at the device and the host system then synchronizes the folder hierarchy of the device with a folder hierarchy of the host system, and any actions executed on the data items at the device are then automatically replicated on the same data items stored at the host system, thus eliminating the need for the user to manually replicate actions at the host system that have been executed at the mobile wireless communications device.

The foregoing system advantageously provides great convenience to users of wireless email communication devices for organizing and managing their email messages. Yet, further convenience and efficiency features may be desired in email distribution and synchronization systems as email usage continues to grow in popularity.

BRIEF DESCRIPTION OF THE DRAWINGS

Other objects, features and advantages will become apparent from the detailed description which follows when considered in light of the accompanying drawings in which.

DETAILED DESCRIPTION OF THE PREFERRED EMBODIMENTS

Different embodiments will now be described more fully hereinafter with reference to the accompanying drawings, in which preferred embodiments are shown. Many different forms can be set forth and described embodiments should not be construed as limited to the embodiments set forth herein. Rather, these embodiments are provided so that this disclosure will be thorough and complete, and will fully convey the scope to those skilled in the art. Like numbers refer to like elements throughout.

The communications system includes a network engine that communicates with the plurality of a user subscribed mobile wireless communications devices via a communications network for sending and receiving emails. A direct access server is connected to the network engine for polling electronic mailboxes of users from an email source and retrieving electronic messages from the electronic mailboxes and pushing any electronic mailboxes to the network engine to selected user subscribed mobile wireless communications devices. The direct access server communicates with an email source using the internet message access protocol (IMAP) and IMAP-Idle supportable connections in a communications channel to accept real-time notifications. The direct access server verifies Idle command functionality on the communications channel before relying on the communications channel for new mail notifications.

In one example, if the direct access server determines that messages are found for which no notification was sent, the direct access server increases a fail count. If the fail count exceeds a predetermined limit the direct access server switches to polling the mail server as an email source and ceases to use IMAP Idle. In yet another aspect, when a connection limit is reached or exceeded to an email source, the direct access server disables IMAP-Idle connections to the email source.

Figure 1:
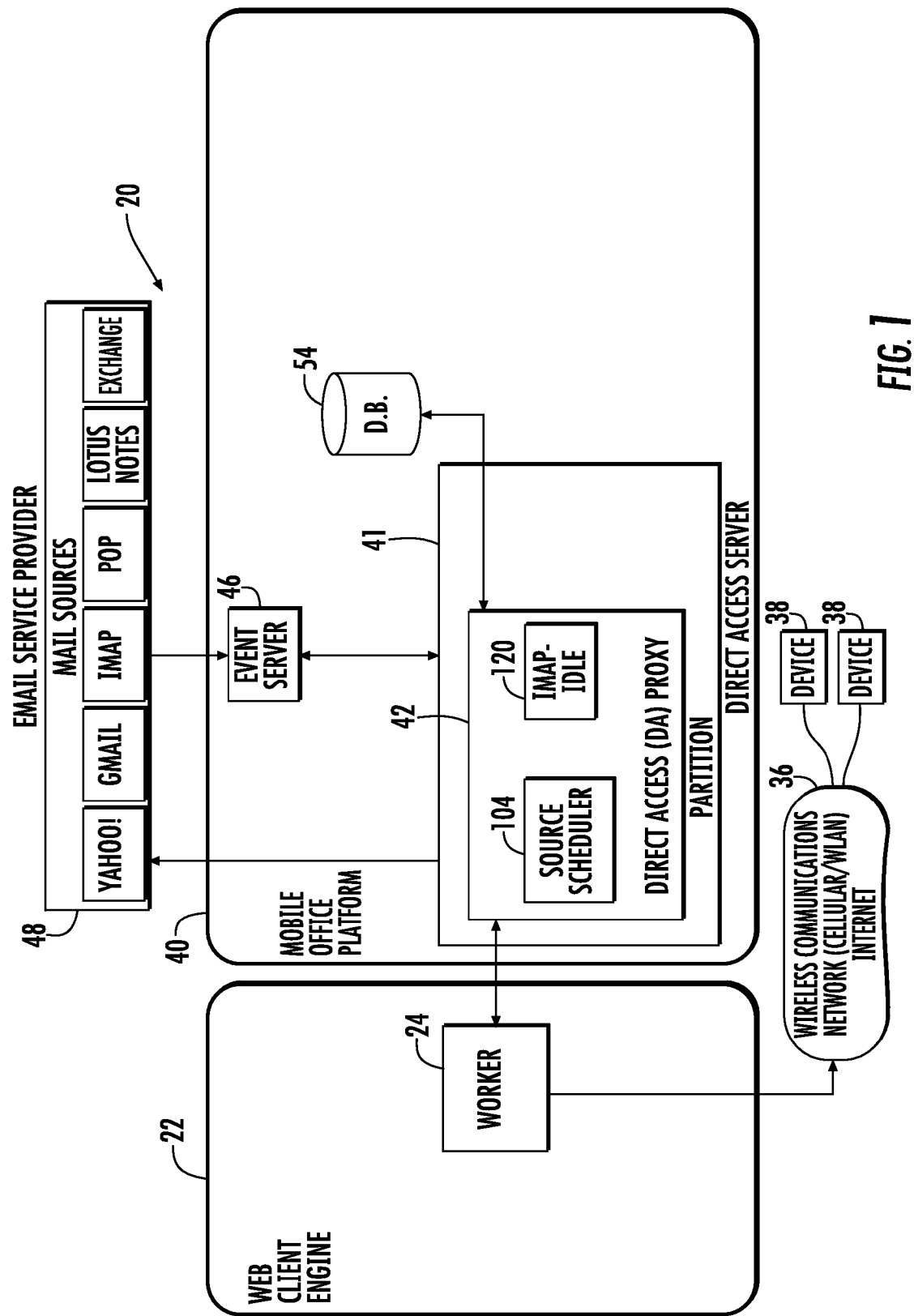
FIG. 1 is a schematic block diagram of a direct access electronic mail (email) distribution and synchronization system in accordance with non-limiting examples.

Basic components of the Direct Access email system 20 are shown in FIG. 1. The web client or network engine 22 has various components. The worker 24 is a processing agent that is responsible for most processing in the engine 22 and includes SMTP and HTTP server support. It accepts email from the DA proxy and external mail routers, formats email in CMIME, and sends it to other components.

A Wireless Communications Network 36, such as a cellular network or WLAN and cooperates with the worker. The Network 36 communicates with one or more wireless communications devices 38, such as portable wireless communications devices.

The mobile office platform 40 has different components. The DA proxy (DA) 42 includes service through which integrated source messages are delivered to or retrieved from by the worker 24. It is responsible for polling sources such as mailboxes, processing source notifications and retrieval and update of source messages via a proxy, which could abstract access to disparate mail stores into a common protocol. The event server 46 is a lightweight process on a server that receives notifications from external sources (ISPs and SMC) and different user mailboxes and processes them asynchronously without blocking the sender of notifications. The integrated mail sources 48 as email service providers include non-limiting examples such as Yahoo!, Gmail, IMAP, POP, Lotus Notes, and Exchange in this non-limiting example. The different databases 54 store system wide data related to sites/carriers, mailbox providers (AOL, Yahoo), service books, devices and user accounts.

A source scheduler 104 and IMAP-Idle connection module (manager) 120 are shown. Messages for a message to handheld can arrive to the network engine 22. Another path is via the proxy 42. This path can be used for integrated sources. When the DA Proxy 42 detects a new mail from an integrated source the DA proxy 42 will fetch the message make a directory lookup for the appropriate worker and push the message to the worker. The worker will then perform the same operation it did for hosted mail.

As noted before, the other path is through the proxy 42. The worker 24 is responsible for converting messages between MIME and CMIME, encrypting and decrypting messages, compressing and decompressing messages, and attachment viewing. The system wide data stored in a database 54 could include information about:

a) Sites/carriers (e.g., TMobile, Cingular);
b) Mailbox providers (AOL, Yahoo);
c) Service books;
d) Device information; and
e) Hosted mailbox mappings.

A database 54 can contain data related to a user account and integrated sources such as: integrated sources, alert rules, signature and similar items. Data in the database 54 could relate to the tracking of message UID's for each integrated source.

The Event Server 46 is a process that acts as a message queue for HTTP notifications from external sources (ISPs and SMC). The messages are processed asynchronously so as not to block the source. The processing of the message involves dispatching to the appropriate service. The event server is also used internally to send out subscription request via SOAP.

The proxy can include subset proxies that provide access to external mail sources 48 via an enhanced HTTP Mail interface. The proxy supports different mail sources in a non-limiting example:

a) IMAP with special implementations for AOL/Compuserve, Yahoo;
b) POP with special implementations for MSN, RPA, Gmail;
c) Mail Connector for access to Domino and Exchange;
d) Hotmail; and
e) Outlook web access.

The DA proxy 42 is the conduit for sending and receiving emails between the engine 22 and the integrated mail sources 48. Additionally, the DA proxy is responsible for detecting new mail from external mail sources and pushing to the engine 22. Three mechanisms of detection are used for polling, subscription to mailbox for notifications, and permanent connections to sources.

It also provides the engine with access to User data. It processes message from handheld messages for integrated sources (new mail, reply, forward, delete). It also pushes service books to the engine.

Polling of sources is scheduled at even intervals (usually 15 minutes). Sometimes a source poll is expedited if heuristics determines that it is likely to find new mail. A full poll retrieves all message ids from a source mailbox to do a full reconciliation against all message ids (UIDs) that previous polls have found. A quick poll retrieves only a "page" of source message ID's at a time.

Some source types (IMAP IDLE) support a notification mechanism via a permanent connection to the source. The proxy is responsible for making sure that these connections are created, managed and destroyed as appropriate.

The DA proxy 42 communicates with the worker 24 over an HTTP interface. The DA proxy handles a fixed number of users for a particular partition. The number of users a DA proxy can handle is calculated by measuring its performance. The more users assigned to a partition the more DA proxies, the system will deploy. The load is distributed evenly betweens DA proxies any directory components.

IMAP-Idle improvements occur. IMAP-Idle is described in RFC 2177, which is incorporated by reference in its entirety. There are advantages for the IMAP-Idle connection limits on a per user basis and per server basis and advantages for same. There are two problems this improvement in IMAP-Idle solution addresses.

First, a single host such as AOL may have X amount of users and allow Y amount of simultaneous TCP connection (where X>Y). If all X AOL users support IMAP-Idle, connection attempts will be made for all X users even though only Y connections are supported. If unaddressed, other hosts would be unable to make other TCP connections to the host.

Second, a single user's IMAP email account may only support one simultaneous TCP connection. If a second connection is used to retrieve user data from the same account, the first connection or second connection may be disconnected with or without warning. Assuming this went unaccounted for, mail integration would fail indefinitely.

An IMAP-Idle Java connection manager is implemented in the system. Because there are so many varying TCP connection limits from domain to domain, it is not desirable to set a hard coded outbound TCP connection limit to these domains. Instead, an IMAP-Idle connection manager is introduced to manage IMAP-Idle connection failures. If an IMAP-Idle connection fails a failure streak, management by the IMAP-Idle manager is increased by one until it reaches a limit. If the limit is reached or exceeded the source is marked IMAP-Idle "disabled" and the source will not be connected in order to establish an IMAP-Idle connection. Therefore, if domain A has a set limit D and the system successfully connects D time, all subsequent IMAP-Idle and poll connection attempts will fail. By marking sources invalid for this type of connection, it ensures all sources have access to this domain. If the IMAP-Idle connection was dropped, the system determines if it dropped while an email poll (secondary connection) was in progress. If so, the account is marked IMAP-Idle "disabled" and the account will not be subscribed to in the future, thus, preserving resources and improving the user's email delivery experience.

The IMAP-Idle definition states that the IMAP server displays the term IDLE when the server is asked what capabilities it supports. If the server claims to support IMAP-Idle, but fails to enter the IDLE state, the system continuously attempts to establish IMAP-Idle connections when one is not possible. An IMAP-Idle manager is implemented which checks the result of attempting to establish an IMAP-Idle connection. If the connection fails X times in a row, the IMAP-Idle feature will be disabled so the system can stop attempting to connect to an unsupported or incorrectly configured service.

These are instances when the email server reports IMAP IDLE capabilities but fails to actually enter the IDLE state. In this case the IMAP IDLE manager will track the number of attempts to establish an IMAP IDLE connection to that server and if the failure exceeds a pre-specified threshold, then the system can stop attempting to connect to an unsupported service.

The system polling environment can attempt to poll the account at an intelligent interval hoping to find new mail messages. If new mail is available, it is downloaded and sent to the user via their device. If this account is subscribable (IMAP-Idle supported), the system can reduce the amount of connections and connection attempts to the host, which do not accept high connection rates. The system can minimize the amount of data sent over the internet and produces a fast email delivery system.

The IMAP-Idle connection can monitor the account for changes that occur and immediately download new information when an event occurs. This allows the system to skip (unneeded) empty polls for a source that has not received any new mail. Skipping the polls saves data transfer, any unnecessary TCP connection, connection attempts and also real time email delivery. This implementation is centralized and is represented as a subscription as opposed to PALM and MS systems, which are device and application based.

IMAP IDLE is an optional expansion of the IMAP email accessing protocol that allows the server to send new message updates to the client in real time. Instead of having the system email program check for new mail every few minutes, the IMAP IDLE allows the server to notify the email program when new messages have arrived. The system can see incoming mail immediately. The use of IMAP IDLE is known. However, the difference from PALM is that the system implements this on the system as with the DA proxy 42 not on the device.

The IMAP servers are set up to allow 30-minute TCP connection before they may disconnect them according to the IMAP RFC. If the system is to maintain an IMAP-Idle connection indefinitely, it should find a method to avoid this without missing new mail events produced by the IMAP-Idle connection in the meantime. Because several internet domains are known to disconnect TCP connections earlier than 30 minutes, the system resubscribes every X minutes, where X is configurable. To resubscribe the system quickly, it issues an IMAP "fetch" to check if new mail was received before re-entering the IDLE (subscribed state). This ensures the connection is kept alive and new email events are not lost.

In accordance with non-limiting examples, IMAP protocol is updated with a new command IDLE, using which clients go into an 'idle' mode. In this mode, an IMAP server sends mailbox changes as untagged responses to the 'idle' client, such as when new messages are added or when they are deleted. Clients come out of this 'idle' mode by issuing a DONE.

The MOP 40 as a Direct Access server currently supports a subscription/notification model for real-time mail delivery. In this model, a mailbox-provider notifies the MOP when new mail arrives at a mailbox. There is no persistent connection between the MOP 40 and mail-provider.

By supporting IMAP IDLE, the MOP 40 can make it easy for the mail-providers to support real-time mail delivery. To support IMAP IDLE, the MOP would need to maintain a persistent connection to the mail-provider. The connections used in this IMAP-Idle implementation will be used solely to detect new mail and notify that the related source is ready to be polled. All previous MTH and MFH jobs remain as work completed by the DA proxy work queue and its UP servlet. The system supports real-time notifications for all IMAP sources that support IDLE capability.

External subscriptions are persistent subscriptions made with external mail providers such as Yahoo and Gmail. Idle login failures occur when after an invalid login attempt is received trying to initialize an IMAP-Idle connection. Receiving this failure will increment the existing login failure streak to one.

An idle subscription failure streak will include all connection and command related errors while attempting to establish an idling state for a particular IMAP source. Typically, login failures are not included in the count.

Figure 2:
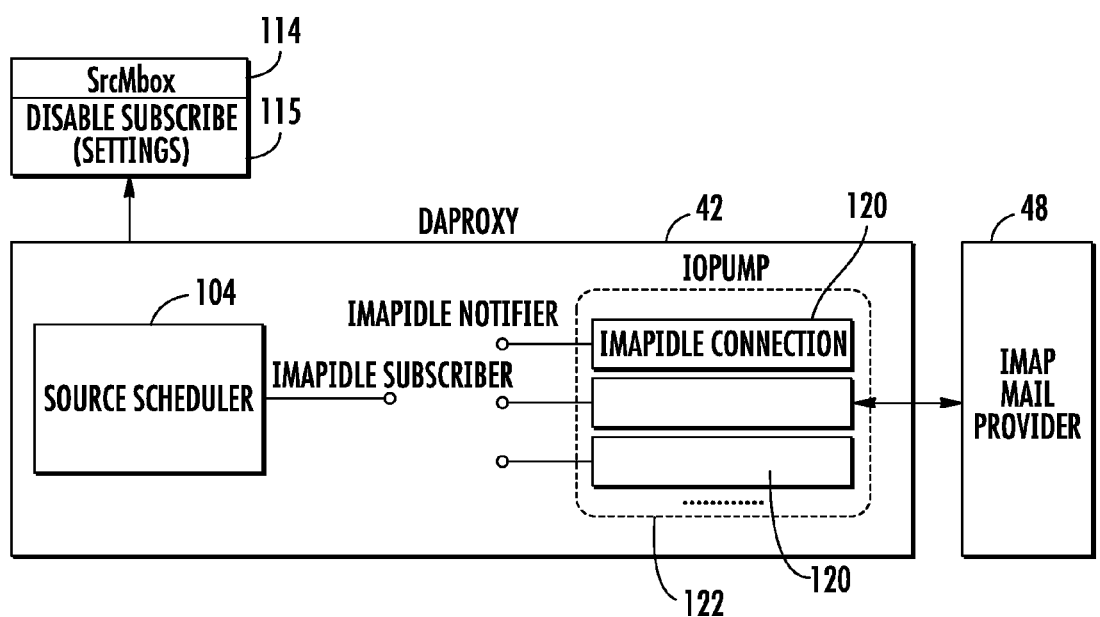
FIG. 2 is a block diagram showing basic components of the Direct Access Proxy with the IMAP Mail Provider.

To support IMAP IDLE, the system will maintain a separate ImapIdleConnection 120 for each user in the DA Proxy 42 as shown in FIG. 2.

The ImapIdleConnection 120 discovers the presence of new mail and this triggers the normal polling mechanism that goes through UPServlet, which will continue to be used for polling and all MFH operations. Creating ImapIdleConnections 120 in the DA Proxy helps the polling system in the DA Proxy keep track of these connections for each source. An IOPump 122 serves as the connection manager for all ImapIdleConnections 120.

Unlike external subscriptions that are persisted in the database IMAP-Idle subscriptions are considered transient and are only in the memory of DA Proxy.

The Source Scheduler 104 and DA Proxy keep track of IMAP IDLE subscriptions. Unlike external subscriptions which are persisted in the SrcMbox table with a subscriptionId, these subscriptions are in memory. Once a poll is successful, the Source Scheduler 104 determines if a source capable of IMAP-IDLE is not yet subscribed. The Source Scheduler 104 creates an ImapIdleConnection for this source mailbox 114 and initiates the subscription process. Sources that are marked with 'disableSubscribe' 115 will not be subscribed.

Figure 3:
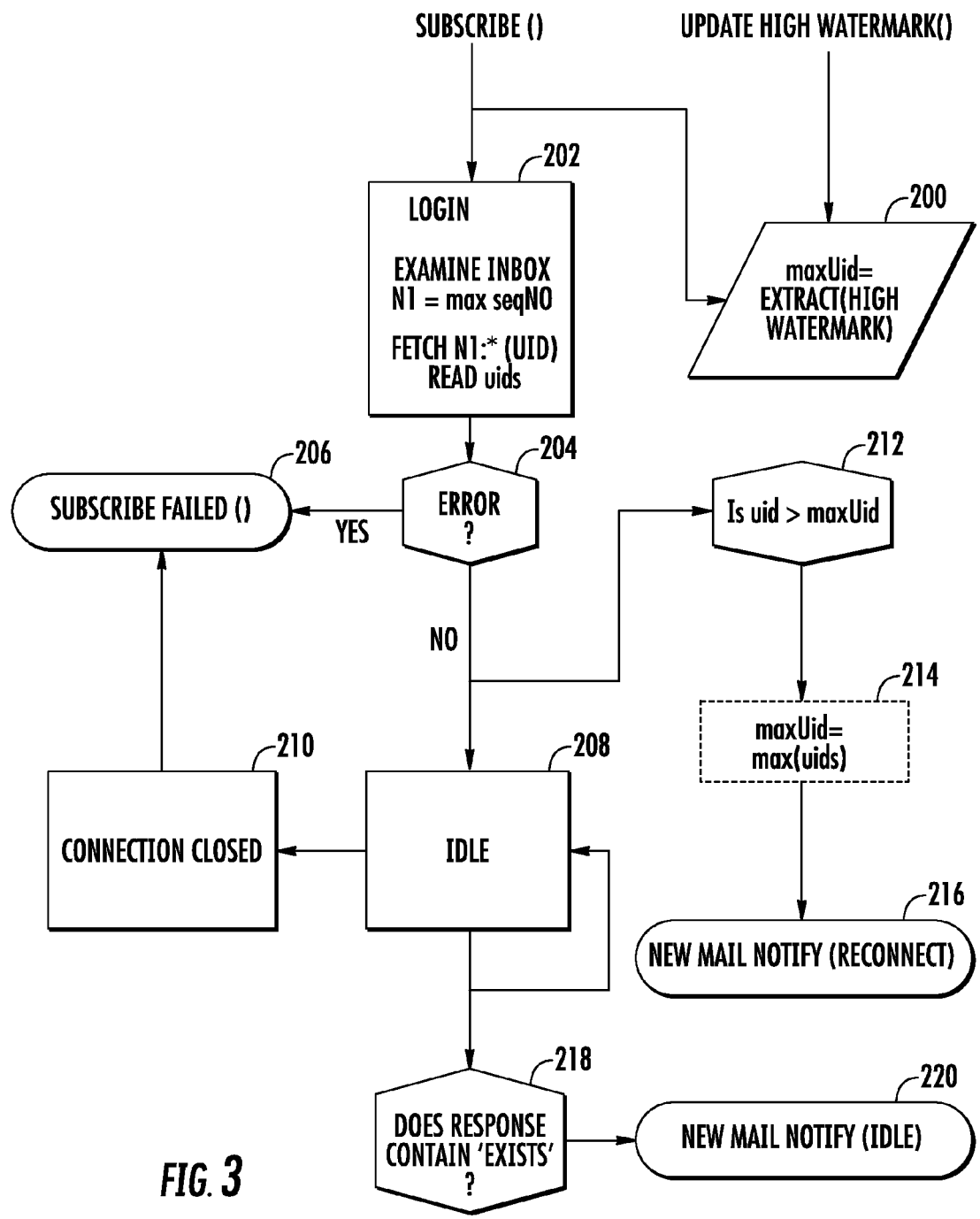
FIG. 3 is a flowchart showing functional steps for the IMAP idle connection.

After each poll, the Source Scheduler 104 updates the subscription in an ImapIdleConnection. Updates to a highWaterMark as shown in the flowchart of FIG. 3 allows the ImapIdleConnection to appropriately discover new messages when an 'idle' connection closes. Additionally, this will allow an ImapIdleConnection to pick up any changes to the sourcemailbox such as updates to the source mailbox data such as the server/user/password.

FIG. 3 illustrates a login, determination, and IDLE to show the IMAP-Idle connection in discovering new emails.

An optimization can be made for IMAP-IDLE sources to immediately change the nextPoll to after six hours. For external subscriptions, the system can change the nextPoll only after the next poll to catch any new mails between last poll and a successful subscribe request. The ImapIdleConnection can discover any new mail since the last poll. As a result, this optimization can be made.

If the Source Scheduler 104 discovers that a source should not be polled any longer, it notifies any existing ImapIdleConnection 120 to stop further notifications and cleans up the ImapIdleConnection.

The Source Scheduler 104 is notified when the ImapIdleConnection 120 discovers new mail in the mailbox. The Source Scheduler schedules a poll upon such notification. If the ImapIdleConnection 120 cannot go into idle mode, it notifies the Source Scheduler that the subscription had failed. Some of the failures are Idle login failures and the remaining are Idle subscriptions failures.

As shown in the flowchart of FIG. 3, to utilize the IMAP-Idle connection 120 the Source Scheduler 104 must first determine if the IMAP source is subscribable. To determine this, the DA Proxy makes a callback to the Source Scheduler once a poll for this source completes. The callback lists new properties such as the high water mark and subscribability.

If the source happens to be subscribable the source scheduler will create a new subscription job and add it to the DA Proxy processing queue. These jobs are handled by the subscribe and unsubscribe handlers.

The handlers' first task is determining which resource to use to complete its job. For ImapIdleConnection the Source Scheduler is that resource. The handler makes a call into Source Scheduler to subscribe to this specific source and is provided a response code for the success or failure of that process as shown in FIG. 3. The flowchart in FIG. 3 begins with a subscribe and update of the high watermark to determine a max UID (Block 200). Login occurs (Block 202) and a determination made whether there is an error (Block 204). If yes, the subscriber has failed (Block 206). If no, the idle connection is operative (Block 208) and connection closed (Block 210). Also, a determination is made if the UID is greater than a max UID (Block 212) and that the max UID is equal to the max (UID's) (Block 214). The new mail notify reconnects (Block 216). Also, a determination after idle (Block 208) is made. Does the response contain "Exists" (Block 218) and if yes, then the new mail notify (idle) occurs (Block 220).

A callback is made on completion of the subscription job. If the subscription was successful the subscribable flag will be cleared and the source will be marked as a subscribed.

Figure 4:
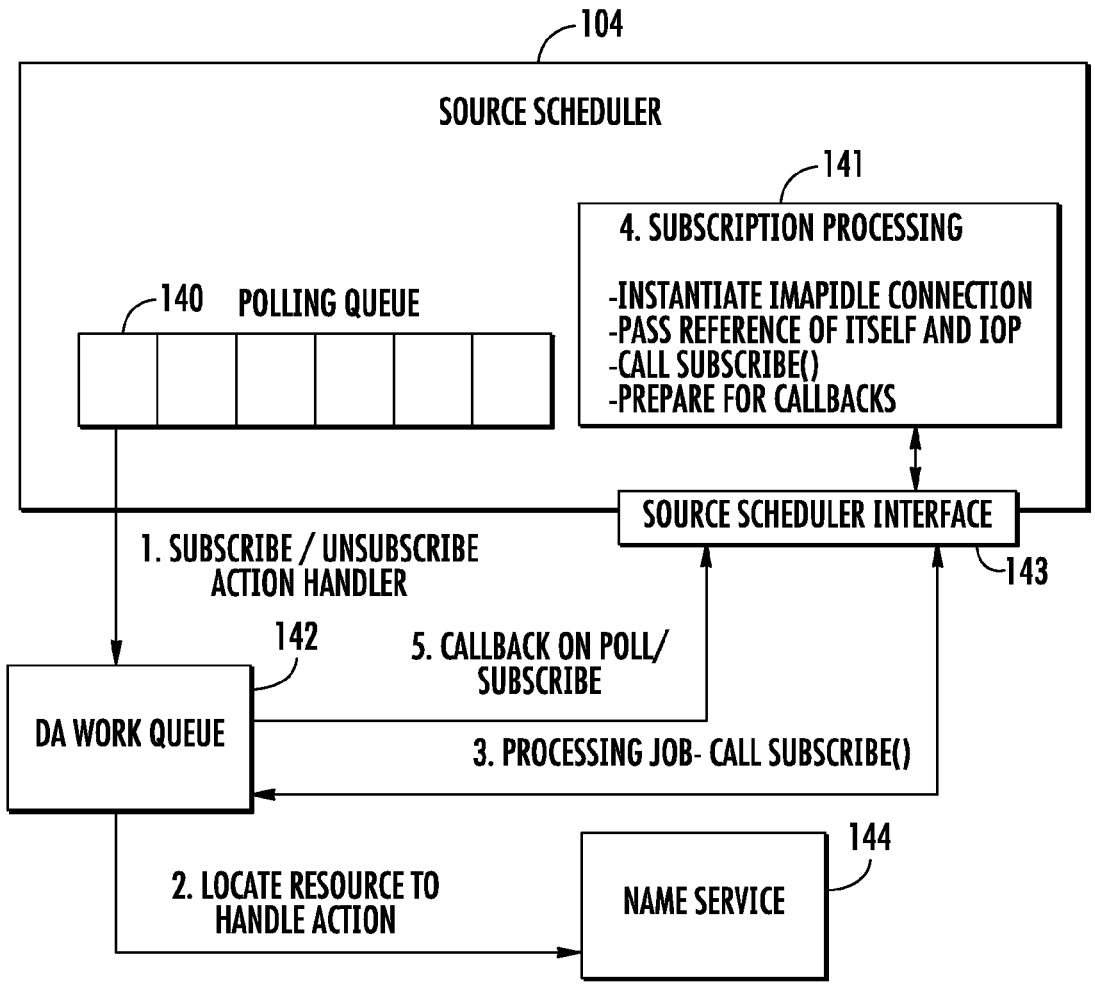
FIG. 4 is a block diagram showing basic components of a Source Scheduler and interoperation among components, including the instantiation of the IMAP Idle connection.

FIG. 4 is a diagram showing the source scheduler 104 and polling queue 140 when a source has already been marked subscribable by the previous callback from the poll into the Source Scheduler. The polling queue 140, subscription processing module 141, DA proxy work queue 142, source scheduler interface 143 and name server 144 are illustrated and work together as shown.

If an ImapIdleConnection 120 encounters a connection error or an error in issuing commands, it notifies the Source Scheduler 104 that the subscription had failed by returning an idle subscription failure. The Source Scheduler keeps track of the error and pulls in the next poll for that source to within 15 minutes from the last poll. If the failureStreak for this error exceeds a configurable limit, this source will be marked with 'disableSubscribe' settings bit.

If the ImapIdleConnection discovers a login failure, it returns an idle login failure to the Source Scheduler. The Source Scheduler bumps up the existing login failure streak on the source. Any source with a failureStreak>0, will not be subscribable. Login failures will not result in persistent 'disableSubscribe' bit.

Figure 5:
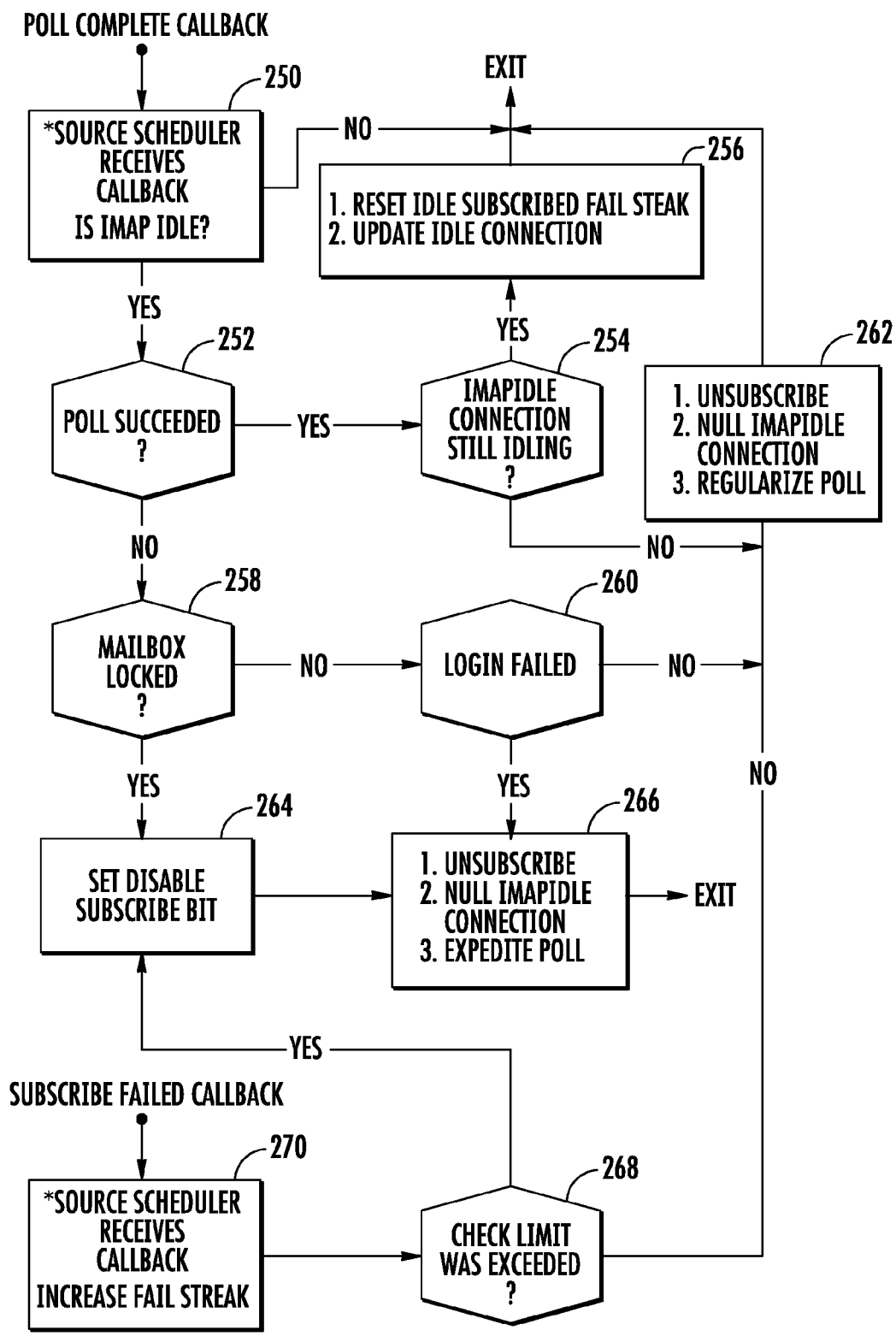
FIG. 5 is a flowchart showing basic steps for the IMAP idle support.

Some implementations of IMAP protocol exhibit a race condition. If a mailbox receives a new mail after the client goes into select state and before an idle command is issued, the system will return an untagged 'exists' response indicating the presence of new mail. FIG. 5 illustrates a flowchart of the method.

The system mitigates this by immediately issuing an 'idle' command after the system receives a response for a 'fetch' command. The system parses the 'fetch' response asynchronously after the 'idle' command is issued. The race condition is not avoided completely, but is reduced to a very short interval, hopefully less than a second.

This problem is further mitigated by the mechanism originally designed to reset IMAP timeout timers. To reset the timeout timer the ImapIdleConnection object will issue a 'DONE', to leave the IMAP-idling state, followed by a 'FETCH' to reset the timer and check for new mail received. If mail was missed during the previous race condition or due to a faulty idle implementation it will be caught here. This will be executed every 5 minutes but will be configurable.

The Source Scheduler keeps track of new mail discovered on re-connects. If it successively discovers new mail only on re-connect and reaches a configurable limit (default is 0-infinity), it calls back on Source Scheduler (itself), disabling the subscription, additionally marking the source 'disableSubscription'. On new mail notifications, ImapIdleConnection informs Source Scheduler whether the discovery is from a re-connect (poll) or idle notification.

By setting the default to infinity the existing connection provides a lighter polling alternative and is therefore still acceptable.

If the Source Scheduler discovers new mail during fallback polls, it keeps track of streaks of 'newMailOnFallback'. If this reaches a configurable maximum, this IMAP-Idle source will be marked with 'disableSubscribe' which is persisted in the database. For external subscriptions, they will be unsubscribed and re-subscribed on a next poll. The default value for this limit is 3.

Additionally, to improve user experience, the Source Scheduler will change the next-poll to the default 15 minutes when new mail is discovered on a fall back poll. For external subscriptions, they will be unsubscribed and re-subscribed on next poll. The system can thus address when the subscriptions become out of sync.

If a mail-provider restricts the number of connections allowed, the system will discover these limitations as normal connection-failures resulting in marking the mailbox as a 'disableSubscribe.' This is also true for AOL.

Similar to POP, IMAP servers can also return 'mailbox locked' errors. If ImapIdleConnection returns a 'mailbox locked' error, the source is immediately unsubscribed and marked with 'disableSubscribe'. On the other hand, if 'mailbox locked' is returned as error during normal polls, the Source Scheduler recognizes this and if there is an existing ImapIdleConnection for the source, unsubscribes it and marks the source with 'disableSubscribe.'

If an IMAP-Idle connection is disconnected while the source scheduler is processing a new mail notification the scheduler will increment the IMAP subscribe failure streak and continue with the next source. Assuming the poll succeeded the source will be marked as subscribe-able or un-subscribe-able by the polling mechanism. If the poll was unsuccessful the source scheduler will continue to poll this source every 15 minutes.

If a poll connection fails while an IMAP-Idle connection exists the scheduler will unsubscribe the source, increase the fail-streak and expedite the poll. By providing a mechanism to reset the failure streaks the system will not run into a long-term problem and find all sources 'disableSubscribe.'

The system can avoid IMAP-Idle race-condition by using another connection to check for new mails after the IMAP-Idle connections goes into an idle mode. This can also be by triggering additional poll every time we enter idle mode. Some servers may close the servers far more often and the system does not necessarily want to poll on every connection closure. The system enters an idle mode on every connection closure. The system can issue 'fetch' and 'idle' commands simultaneously, reducing the race-condition even further.

IMAP-Idle monitoring is used to monitor the health of the feature. The following fields will allow a manager to determine if a particular source scheduler is able to subscribe to IMAP sources and how the amount of subscriptions fluctuate (errors received) during polling intervals. Different fields can be monitored such as:

number of idle connections (cumulative);

time to subscribe (cumulative);
number of subscription requests (cumulative);
new mail notification—idle (cumulative);
new mail notification—re-connect (cumulative);
login failures (cumulative);
mailbox locked (cumulative);
connections lost (cumulative);
IMAP commands failed (cumulative);
idle state lost (cumulative);
poll failed (cumulative); and
how many disableSubscribe bit were set (cumulative).

With a poll complete callback, the source scheduler receives a callback IMAP Idle? (Block 250). If not, exit occurs. If yes, a determination is made whether the poll succeeded (Block 252). If yes, a determination is made whether the IMAP Idle connection is still idling (Block 254). If yes, the idle subscribed fail streak is reset and the idle connection is updated (Block 256). If the poll has not succeeded in Block 252, a determination is made whether the mailbox is locked (Block 258), and if not, a determination is made whether the login has failed (Block 260). If not, the system unsubscribes, nulls the IMAP Idle connection and regularizes the poll (Block 262). The same occurs if the IMAP Idle connection is not idling in Block 254. If the mailbox is locked in Block 258, the disable subscribe bit is set (Block 264). At this time, the system unsubscribes, nulls the IMAP Idle connection and expedites the poll (Block 266). It exits. If login failed, a determination is also made whether the check limit was exceeded (Block 268). This check is also made if the source scheduler receives a callback and increases the fail streak (Block 270).

It has been noted that several IMAP servers in production (or commercial, regular use) environments advertise the support of the extended IMAP command IDLE, but fail to provide new mail notifications in the SELECTED state. As a result, no new mail is detected at the email source causing large delays in mail flow for that particular source. In some systems, the mobile office platform would automatically trust all IMAP idle connections, expecting that a system would notify when new mail was received. In one example, the mobile office platform maintains a 15-minute polling for this source. If new mail is detected at the source and is not found as a result of a new mail notification, a fail streak is increased. If this fail streak exceeds a configurable limit, the source is Idle disabled and will not attempt this method going forward.

In accordance with a non-limiting aspect, the system learns the IMAP idle capabilities of a source and verifies the Idle command's functionality before relying on it for new mail notifications. The system now uses a "trusted" or "verified" IMAP-Idle implementation. This overcomes the drawback when IMAP servers are not correctly implemented and do not respond to the IMAP idle extension. In addition to using the IMAP idle, the system can periodically check the server using polling. If messages are found for which no notification was sent, the system increases a fail count. If the fail count exceeds a certain limit, the system switches to polling that particular server (email source) and ceases to use IMAP idle. Thus, the system now addresses the problems when the IMAP idle fails to deliver mail because of a poor wireless connection and had been issuing IMAP Idle every 15 minutes or thereabouts.

Different systems such as Yahoo, GMail, and Hotmail can be polled in addition to the notification method as invoked. Thus, the problem overcoming the poor implementation of IMAP idle on the server can be addressed and the detection and switching to polling is used and without reissuing the IMAP Idle. With Yahoo, GMail, and Hotmail, the protocols are proprietary and it is not clear that the notification method is disabled. The system switches to polling if the system finds stale emails on the server (email source).

The reason why some servers fail to provide new mail notifications in the SELECTED states is a design flaw on the IMAP server side when the IMAP idle RFC is used as the implementation standard. In IMAP, there are no other notification methods if a tail streak exceeds a configurable limit. If this method fails, the system in those cases falls back to regular polling. GMail, Yahoo mail and Hotmail all may have problems with the notification and the system could apply polling periodically to make sure there is no mail left on the server.

Figure 6:
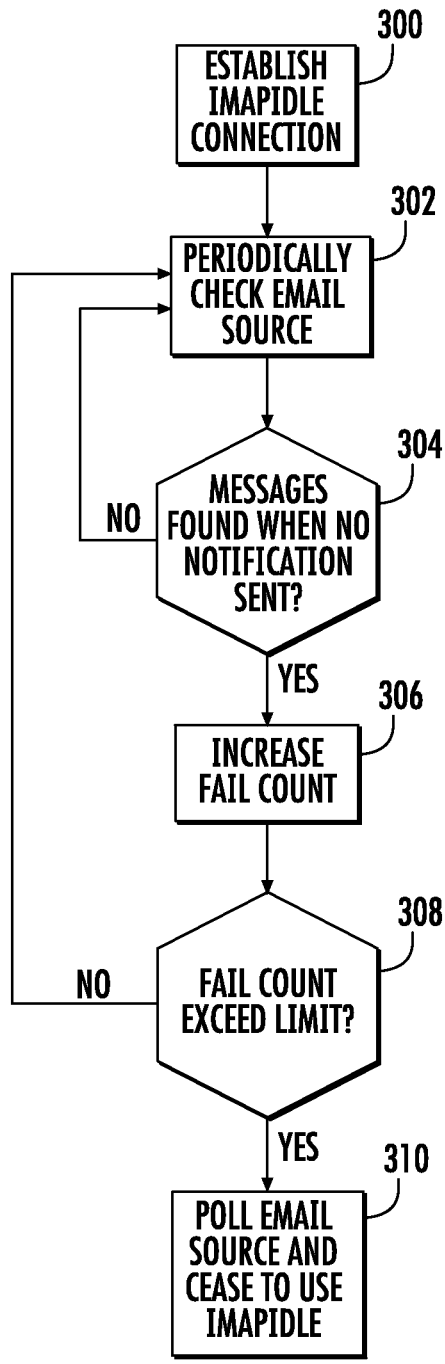
FIG. 6 is a flowchart showing basic steps of IMAP idle support with a trusted or verified implementation.
Figure 7:
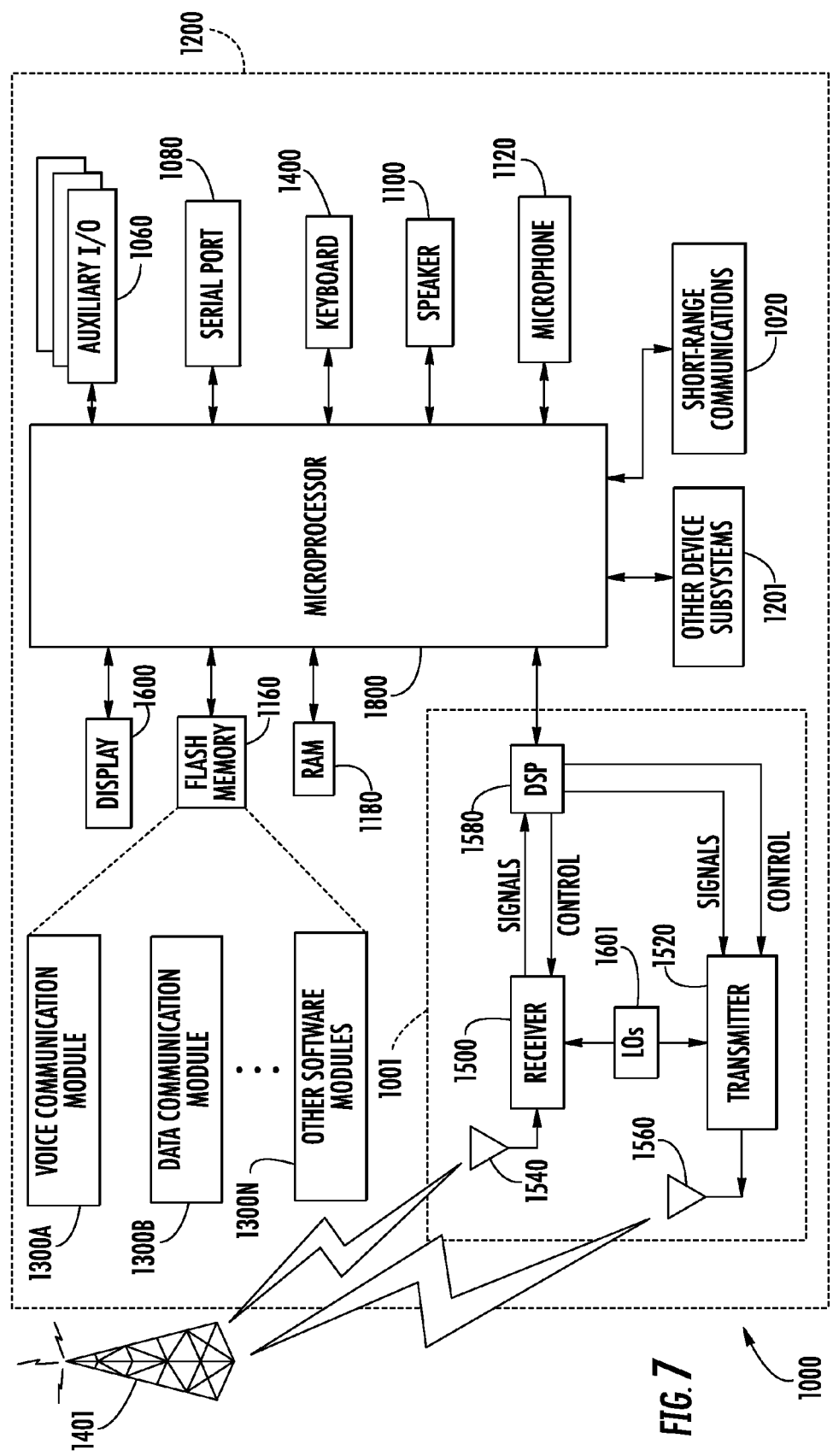
FIG. 7 is a schematic block diagram illustrating an exemplary mobile wireless communications device that can be used with the Direct Access email system shown in FIG. 1.

FIG. 6 is a flowchart showing basic steps of the IMAP idle support with a trusted or verified implementation in the communications channel. As illustrated, the IMAP idle connection is first established (block 300). The system does not trust any notification for the connection so that the channel is open. Thus, the system through the direct access server does not trust the connection until traffic exists on that channel. The system establishes that it is working before it begins to use it such as by having the server verify an Idle command functionality before relying on the communications channel for new mail notifications. The email source (server) in one aspect is periodically checked (block 302) in addition to using IMAP idle with polling. If messages are found for which no notification was sent (block 304), a fail count is increased (block 306). If the fail count exceeds a certain limit (block 302) that server or email source is polled and the system ceases to use IMAP-idle (block 310).

Exemplary components of a hand-held mobile wireless communications device 1000 that may be used in accordance with such a system are further described in the example below with reference to FIG. 1. The device 1000 illustratively includes a housing 1200, a keypad 1400 and an output device 1600. The output device shown is a display 1600, which is preferably a full graphic LCD. Other types of output devices may alternatively be utilized. A processing device 1800 is contained within the housing 1200 and is coupled between the keypad 1400 and the display 1600. The processing device 1800 controls the operation of the display 1600, as well as the overall operation of the mobile device 1000, in response to actuation of keys on the keypad 1400 by the user.

The housing 1200 may be elongated vertically, or may take on other sizes and shapes (including clamshell housing structures). The keypad may include a mode selection key, or other hardware or software for switching between text entry and telephony entry.

In addition to the processing device 1800, other parts of the mobile device 1000 are shown schematically in FIG. 1. These include a communications subsystem 1001; a short-range communications subsystem 1020; the keypad 1400 and the display 1600, along with other input/output devices 1060, 1080, 1100 and 1120; as well as memory devices 1160, 1180 and various other device subsystems 1201. The mobile device 1000 is preferably a two-way RF communications device having voice and data communications capabilities. In addition, the mobile device 1000 preferably has the capability to communicate with other computer systems via the Internet.

Operating system software executed by the processing device 1800 is preferably stored in a persistent store, such as the flash memory 1160, but may be stored in other types of memory devices, such as a read only memory (ROM) or similar storage element. In addition, system software, specific device applications, or parts thereof, may be temporarily loaded into a volatile store, such as the random access memory (RAM) 1180. Communications signals received by the mobile device may also be stored in the RAM 1180.

The processing device 1800, in addition to its operating system functions, enables execution of software applications 1300A-1300N on the device 1000. A predetermined set of applications that control basic device operations, such as data and voice communications 1300A and 1300B, may be installed on the device 1000 during manufacture. In addition, a personal information manager (PIM) application may be installed during manufacture. The PIM is preferably capable of organizing and managing data items, such as e-mail, calendar events, voice mails, appointments, and task items. The PIM application is also preferably capable of sending and receiving data items via a wireless network 1401. Preferably, the PIM data items are seamlessly integrated, synchronized and updated via the wireless network 1401 with the device user's corresponding data items stored or associated with a host computer system.

Communication functions, including data and voice communications, are performed through the communications subsystem 1001, and possibly through the short-range communications subsystem. The communications subsystem 1001 includes a receiver 1500, a transmitter 1520, and one or more antennas 1540 and 1560. In addition, the communications subsystem 1001 also includes a processing module, such as a digital signal processor (DSP) 1580, and local oscillators (LOs) 1601. The specific design and implementation of the communications subsystem 1001 is dependent upon the communications network in which the mobile device 1000 is intended to operate. For example, a mobile device 1000 may include a communications subsystem 1001 designed to operate with the Mobitex™, Data TAC™ or General Packet Radio Service (GPRS) mobile data communications networks, and also designed to operate with any of a variety of voice communications networks, such as AMPS, TDMA, CDMA, WCDMA, PCS, GSM, EDGE, etc. Other types of data and voice networks, both separate and integrated, may also be utilized with the mobile device 1000. The mobile device 1000 may also be compliant with other communications standards such as 3GSM, 3GPP, UMTS, etc.

Network access requirements vary depending upon the type of communication system. For example, in the Mobitex and DataTAC networks, mobile devices are registered on the network using a unique personal identification number or PIN associated with each device. In GPRS networks, however, network access is associated with a subscriber or user of a device. A GPRS device therefore requires a subscriber identity module, commonly referred to as a SIM card, in order to operate on a GPRS network.

When required network registration or activation procedures have been completed, the mobile device 1000 may send and receive communications signals over the communication network 1401. Signals received from the communications network 1401 by the antenna 1540 are routed to the receiver 1500, which provides for signal amplification, frequency down conversion, filtering, channel selection, etc., and may also provide analog to digital conversion. Analog-to-digital conversion of the received signal allows the DSP 1580 to perform more complex communications functions, such as demodulation and decoding. In a similar manner, signals to be transmitted to the network 1401 are processed (e.g. modulated and encoded) by the DSP 1580 and are then provided to the transmitter 1520 for digital to analog conversion, frequency up conversion, filtering, amplification and transmission to the communication network 1401 (or networks) via the antenna 1560.

In addition to processing communications signals, the DSP 1580 provides for control of the receiver 1500 and the transmitter 1520. For example, gains applied to communications signals in the receiver 1500 and transmitter 1520 may be adaptively controlled through automatic gain control algorithms implemented in the DSP 1580.

In a data communications mode, a received signal, such as a text message or web page download, is processed by the communications subsystem 1001 and is input to the processing device 1800. The received signal is then further processed by the processing device 1800 for an output to the display 1600, or alternatively to some other auxiliary I/O device 1060. A device user may also compose data items, such as email messages, using the keypad 1400 and/or some other auxiliary I/O device 1060, such as a touchpad, a rocker switch, a thumb-wheel, or some other type of input device. The composed data items may then be transmitted over the communications network 1401 via the communications subsystem 1001.

In a voice communications mode, overall operation of the device is substantially similar to the data communications mode, except that received signals are output to a speaker 1100, and signals for transmission are generated by a microphone 1120. Alternative voice or audio I/O subsystems, such as a voice message recording subsystem, may also be implemented on the device 1000. In addition, the display 1600 may also be utilized in voice communications mode, for example to display the identity of a calling party, the duration of a voice call, or other voice call related information.

The short-range communications subsystem enables communication between the mobile device 1000 and other proximate systems or devices, which need not necessarily be similar devices. For example, the short-range communications subsystem may include an infrared device and associated circuits and components, or a Bluetooth™ communications module to provide for communication with similarly-enabled systems and devices.

Many modifications and other embodiments will come to the mind of one skilled in the art having the benefit of the teachings presented in the foregoing descriptions and the associated drawings. Therefore, it is understood that the described system and method is not to be limited to the specific embodiments disclosed, and that modifications and embodiments are intended to be included within the scope of the appended claims.

That which is claimed is:

1. A communications system, comprising:
   a network engine comprising a hardware processor configured to communicate with a mobile wireless communications device via a communications network for sending and receiving emails therefrom; and
   a direct access server connected to the network engine and comprising a hardware processor configured to: poll an electronic mailbox of a user from an email source, retrieve email from the electronic mailbox and push any email through the network engine to the mobile wireless communications device, communicate with the email source over a communications channel; learn the Internet Message Access Protocol (IMAP) idle capabilities of the email source, establish an IMAP-Idle connection in the communications channel and verify an IMAP-Idle command functionality on the communications channel before relying on the communications channel for new mail notifications by checking if any failures to deliver new mail notifications occur a predetermined number of times, and if so, ceasing to use the IMAP-Idle connection, wherein a connection limit is reached or exceeded to an electronic mailbox, the IMAP-Idle manager disables IMAP-Idle connection to the electronic mailbox and marks the electronic mailbox as IMAP-Idle disabled such that the electronic mailbox will not be connected to establish an IMAP-Idle connection.

2. The communications system according to claim 1, wherein if the IMAP-Idle manager determines that messages are found for which no notification was sent, the IMAP-Idle manager increases a fail count.

3. The communications system according to claim 2, wherein if the fail count exceeds a predetermined limit, said IMAP-Idle manager switches to polling the electronic mailbox and cease to use IMAP-Idle.

4. The communications system according to claim 1, wherein no IMAP-Idle connection can be made to an electronic mailbox when a connection limit has been reached.

5. The communications system according to claim 1, wherein if IMAP-Idle connection attempts to an electronic mailbox fail a predetermined number of times, said IMAP-Idle manager will not attempt to connect to an electronic mailbox using an IMAP-Idle connection.

6. The communications system according to claim 1, wherein said IMAP-Idle manager is operative for determining whether an IMAP-Idle connection has been dropped when a secondary connection was in progress such that an IMAP-Idle connection is disabled.

7. The communications system according to claim 6, wherein said secondary connection comprises a connection for email polling.

8. The communications system according to claim 1, wherein an email account is not subscribed in the future when an IMAP-Idle connection is disabled.

9. The communications system according to claim 1, wherein said IMAP-Idle manager is operative for issuing an IMAP fetch to check if new email was received.

10. A communications method, comprising:
communicating through a network engine and hardware processor with a mobile wireless communications device via a communications network for sending and receiving emails therefrom;
polling an electronic mailbox of a user at an email source from a direct access server;
retrieve email from the electronic mailbox;
push any email through the network engine to the mobile wireless communications device;
communicating with an email source over a communications channel and learn the Internet Message Access Protocol (IMAP) idle capabilities of the email source and establishing the IMAP-Idle connection in the communications channel;
verifying an IMAP-Idle command functionality on the communications channel before relying on the communications channel for new mail notifications by checking if any failures to deliver new mail notifications occur a predetermined number of times, and if so, ceasing to use the IMAP-Idle connection;
disabling the IMAP-Idle connections to the electronic mailbox when a connection limit is reached or exceeded to an electronic mailbox; and
marking the electronic mailbox as IMAP-Idle disabled such that the electronic mailbox will not be connected to establish an IMAP-Idle connection.

11. The method according to claim 10, and further comprising increasing a fail count when the IMAP-Idle manager determines that messages are found for which no notification was sent.

12. The method according to claim 11, and further comprising polling the electronic mailbox if the fail count exceeds a predetermined limit and ceasing to use IMAP-Idle.

13. The method according to claim 10, which further comprises not subscribing in the future to an email account when an IMAP-Idle connection is disabled.

14. The method according to claim 10, which further comprises determining whether an IMAP-Idle connection has been dropped when a secondary connection was in progress such that an IMAP-Idle connection is disabled.

15. The method according to claim 10, which further comprises issuing an IMAP fetch to check if new mail was received.

16. The method according to claim 10, which further comprises user subscribing to an IMAP-Idle enabled connection.

* * * * *